APPARATUS FOR SHAPING ELECTRODES
Original Filed March 13, 1967 2 Sheets-Sheet 1
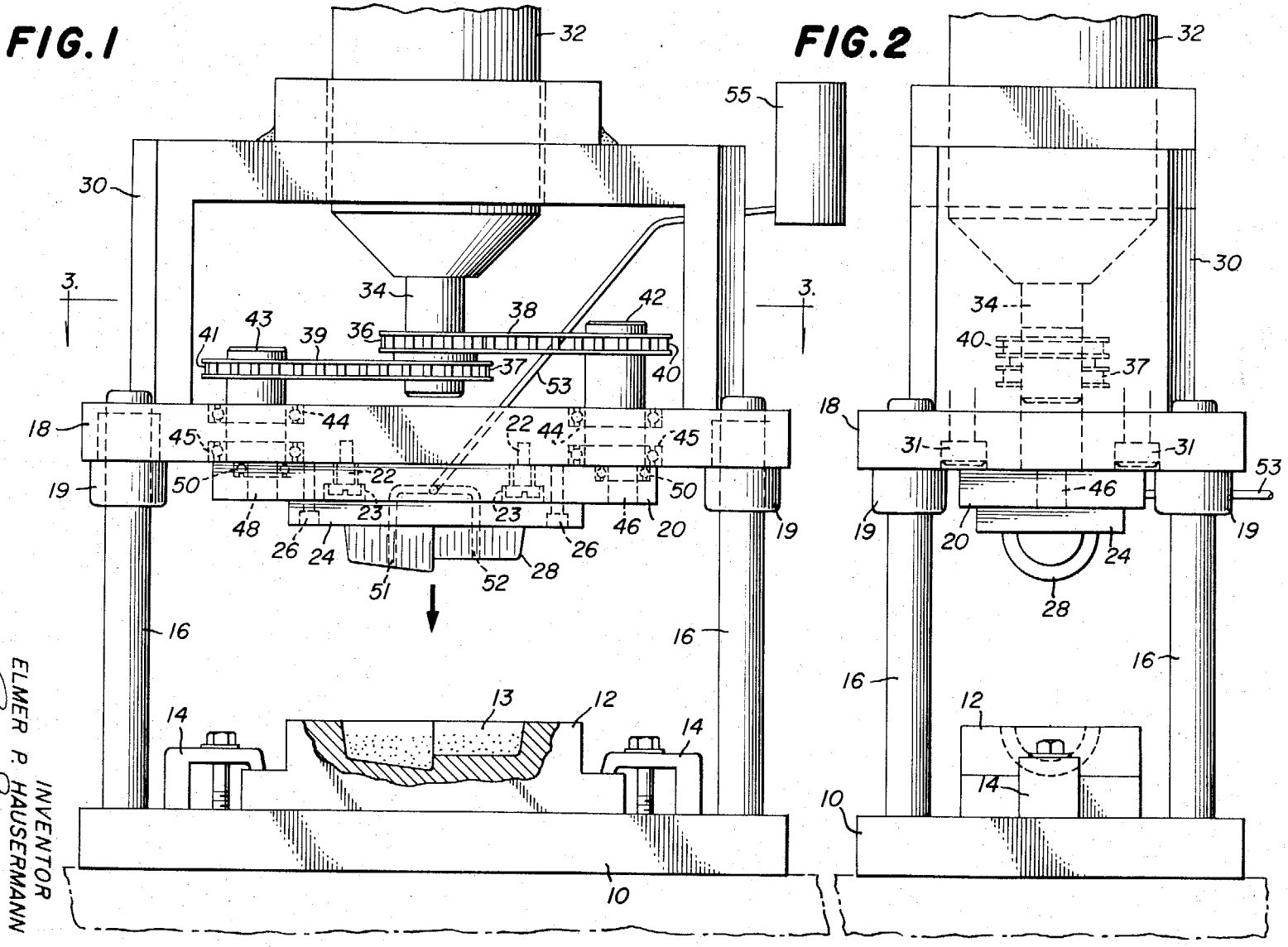
INVENTOR
ELMER P. HAUSERMANN
BY Roger Schmieger
ATTY.

APPARATUS FOR SHAPING ELECTRODES

Original Filed March 13, 1967 2 Sheets-Sheet 2

INVENTOR
ELMER P. HAUSERMANN
BY Roger Schmieder
ATTY.

United States Patent Office

Re. 27,588
Reissued Feb. 27, 1973

27,588
APPARATUS FOR SHAPING ELECTRODES

Elmer P. Hausermann, 301 S. Kenilworth,
Bensenville, Ill. 60126

Original No. 3,465,480, dated Sept. 9, 1969, Ser. No. 622,532, Mar. 13, 1967. Application for reissue Dec. 14, 1970, Ser. No. 98,218
Int. Cl. B24b *19/00*
U.S. Cl. 51—157 10 Claims

Matter enclosed in heavy brackets [ ] appears in the original patent but forms no part of this reissue specification; matter printed in italics indicates the additions made by reissue.

ABSTRACT OF THE DISCLOSURE

Apparatus for shaping electrodes comprising an abrasive die cavity into which an electrode workpiece is forced and wherein an oscillatory motion is given either the workpiece or the die cavity to thereby form the workpiece into the identical shape and contour of the die member.

BACKGROUND

Prior to this invention, die members for forging, molding plastic parts, punch press dies and the like, were obtained either by milling the die cavity out of a piece of steel stock or by burning the die cavity by electrical discharge machining. Preparing a die cavity by milling was relatively uneconomical due to the inordinate amount of time and skilled labor required to make a die member containing all of the proper tolerances.

It was found that die members for preparing parts could be constructed by electrical discharge machining with substantial savings in time and skilled labor over than normally required to mill and finish die cavities.

Obtaining a die member by electrical discharge machining required the machining of a model of the same construction as that of the part to be formed and thereafter using this model as a pattern in the preparation of electrical discharge machining electrodes. The electrodes were normally cut from an electrically conductive workpiece such as copper, silver, platinum, carbon or the like. The shaped electrodes were then used to burn out the die cavity for forming parts. Normally, when carbon was used, about four electrodes were expended in the production of one die cavity.

The electrical discharge machining electrodes were, of necessity, perfectly constructed in order to prepare the die cavity within prescribed tolerance limits. Prior to this invention, the electrical discharge machining electrodes were normally bench finished after being milled or machined from a workpiece. Bench finishing required that all of the mill marks and other imperfections be removed with emery cloth, sandpaper, files, or other abrasive implements to prepare a perfect electrode for use in burning the die cavity. The milling and bench working of the electrode required a substantial amount of manual labor by a skilled craftsman.

SUMMARY OF THE INVENTION

Briefly described, the present invention is directed to an apparatus for automatically forming intricately designed electrical discharge machining electrodes. The [method and] apparatus of this invention obviates the necessity of bench working electrodes and also may be used to form the electrodes from a blank workpiece. If the apparatus is used to finish the electrodes, i.e., bench finish the electrodes, the electrodes will have been previously roughed out before milling or machining.

The use of this invention for forming or bench finishing electrical discharge machining electrodes involves the steps of forming a die cavity member and mounting it on a platen, preparing a rough workpiece member of an electrical conductive material of the general shape of the required electrical discharge electrode, mounting this workpiece member on a second platen in registered superposed working relation to the die member on the first platen, and forcing the workpiece member into the die cavity while subjecting at least one of the members to oscillatory rotary motion to thereby form the workpiece into the identical shape and contour of the die member.

The apparatus for forming or bench finishing electrodes in accordance with this invention is comprised of a first platen and a second platen mounted in superposed relation to the first platen. One of the platens is provided with a die member with an abrasive surface thereon mounted on the first platen and the second platen is provided with an electrical discharge machining electrode workpiece member mounted thereon in working alignment with the die member means. There are means for applying oscillatory rotary motion to at least one of the platens as well as means for bringing the electrode member and die member into contact with each other while oscillatory rotary motion is applied to at least one of the members. In same shape and contour as the die member.

This invention will be more fully understood from the following description of the drawings in which:

FIGURE 1 is a front elevation of the apparatus of this invention;

FIGURE 2 is a side elevation of the apparatus of this invention;

Figure 3:
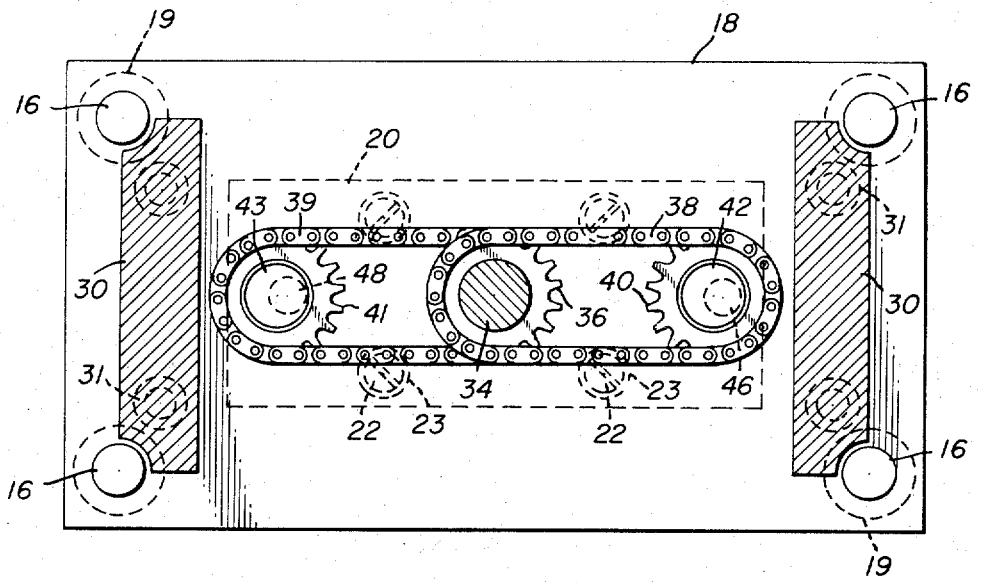
FIGURE 3 is a cross-sectional view taken on lines 3—3 of FIGURE 1.
Figure 4:
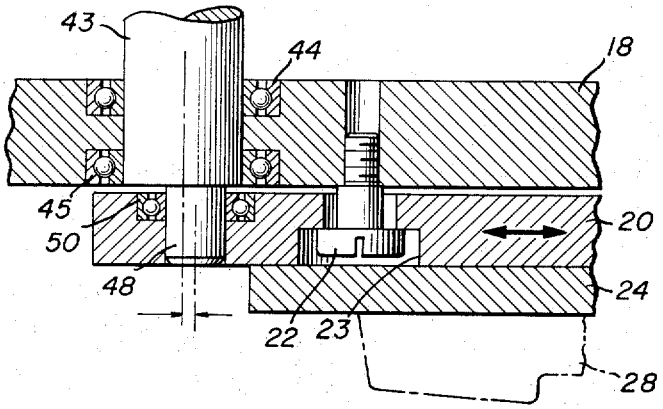
FIGURE 4 is an enlarged fragmentary cross-sectional view of the mounting plate on the upper platen of the apparatus shown in FIGURE 1.

Referring more particularly to the drawings, FIGURE 1 shows a front elevation of a complete apparatus illustrating one manner of utilizing this invention. As shown, there is a base platen 10 on which a die member 12 is mounted by adjustable clamps 14. Die member 12 is provided with an abrasive surface 13 which will be described in detail in conjunction with alternative embodiments thereof.

There are four guide members 16 mounted on base platen 10 which serve as sliding guides for upper platen 18 which is mounted for movement on guides 16 by guide bushings 19.

Upper platen 18 retains a drive member plate 20 on its lower surface by means of bolts 22. Drive plate 20 includes oversize mounting holes 23 to allow for movement and mounting of plate 20 with respect to platen 18.

The drive member plate 20 has electrical discharge machining electrode workpiece mounting members 24 mounted thereon by bolts which fit in bolt holes 26. The mounting member 24 may be an integral part of electrical discharge machining workpiece 28.

Mounted above platen 18 is a frame 30 which encloses a milling machine head 32 which is vertically adjustable as is well known in the art. Frame 30 is attached to platen 18 by bolts 31 (FIGURE 2). Milling machine head 32 is provided with a spindle 34 extending downwardly therefrom, which spindle 34 carries sprockets 36 and 37 at the end thereof.

A chain 38 extends around sprocket 36 on spindle 34 and a second sprocket 40 mounted on shaft 42 to the right of spindle 34 as shown in FIGURE 1.

A chain 39 extends around sprocket 37 and a second sprocket 41 on a shaft 43 to the left of spindle 34. Shaft 42 to the right of spindle 34 and shaft 43 to the left of pindle 34 extend through platen 18 and are retained ithin bearings 44 on the upper surface of platen 18 and earings 45 on the lower surface of platen 18. Shaft 42 provided with a shaft extension 46 that extends through rive plate 20, which extension 46 has a centerline offset om the centerline of shaft 42. Shaft extension 48 of aft 43 extends through drive plate 20 and has a centerne offset from the centerline 43. The offset in shaft exnsions 46 and 48 are equal to each other as will be nderstood from a reading of the description of the opation of the apparatus. Shaft extensions 46 and 48 are tained within bearings 50 on the upper surface of rive plate 20.

As shown, there are two vertical holes 51 and 52 shown in broken outline in electrode workpiece 28) hich are connected with conduit 53. Conduit 53 serves join a solvent source, shown as tank 55, with workiece 28. Those parts set forth in the drawings will be escribed in conjunction with the operation thereof.

OPERATION

To form an electrical discharge machining electrode accordance with this invention, a die 12 is placed on wer platen 10 and adjusted thereon by adjusting clamps 4. The die 12 may be a steel die cavity, silicate agomerate, plastic agglomerate or the like. In any case, e die 12 is provided with an abrasive surface 13. If the e cavity is steel, the abrasive surface may be obtained y overburning on an electrical discharge machine. If e die is a silicate agglomerate, the surface may be suffiently rough without requiring additives. If a plastic marial is used, the addition of sand or silicone carbide may used to form an abrasive surface.

An electrical discharge machining electrode workpiece 8 is mounted on mounting plate 24 attached to movable ember 20. It should be understood that the position of e die member and the electrical discharge machining ectrode workpiece 28 may be reversed if desired. The ectrode workpiece 28 is shown to be stationary and ot adjustable as is die member 12, therefore, the die ember 12 is adjusted by clamps 14 to place the die ember and electrode workpiece 28 in working alignent with each other.

The vertically adjustable milling machine head 32 is tuated, which rotates spindle 34 carrying sprockets 36 d 37. Rotation of sprockets 36 and 37 actuates chains 8 and 39 which in turn, rotates shafts 42 and 43 via rockets 40 and 41 mounted thereon. As mentioned, the aft extensions 46 and 48 have centers that are offset om the center of shafts 42 and 43 and when shafts 42 d 43 are rotated, plate 20 undergoes an oscillatory tary motion. By oscillatory rotary motion, it is meant at the outer periphery of mounting member plate 20 es not spin around the center point of the plate, but at any given point on the plate undergoes a reciprocatg type of circular motion equal to the offset of shaft tensions 46 and 48. This circumferential motion with spect to any point on member 20 is herein referred to as cillatory rotary motion.

The amount of oscillatory rotary motion to which ovable plate 20 is subjected in the figures is fixed by rtue of the offset on shaft extensions 46 and 48 which e integral portions of shafts 42 and 43 respectively. he offset of the extensions may be varied by constructg these extensions as separate adjustable units. When e extensions are separate adjustable parts, the amount motion to which plate 20 is subjected may be varied ithout requiring the removal of shafts 42 and 43.

As shown, the oscillatory rotary motion transmitted mounting member 20 in electrode workpiece undering the same motion as that of mounting member 20 d each point on the electrode workpiece moves within e same circumference as the amount of offset on shaft tensions 46 and 48.

While the oscillatory rotary motion is applied to workpiece 28, it is lowered into die 12 by lowering vertically adjustable milling machine head 32. During that period that the electrode is in contact with die 12, abrading of the electrode 28 takes place to cause electrode 28 to seek the form of die 12. The electrode is kept in contact with the die 12 for short periods of time and then removed while a solvent from tank [54] *55* is passed via conduit [52] *53* and holes [50] *51* and [51] *52* in electrode 28 into die 12 to flush out those particles abraded from electrode 28 which particles were formed while electrode 28 and die 12 were in contact with one another. The type of solvent used to flush out particles depends on the kind of material from which the electrode is constructed and may vary over a wide range from water to a hydrocarbon solvent such as alcohol or kerosene. It has been found that both the aliphatic and aromatic solvents such as alcohol, kerosene, benzene, toluene and the like are preferred when carbon electrodes are being formed.

As mentioned, the electrode formed in accordance with this invention may be initiated from either a crude workpiece block or a milled workpiece having the milling marks thereon and only requiring bench work. In either case, the invention provides an electrode free of imperfections, free of mill marks and within the prescribed tolerances for electrical discharge machining use.

The speed at which the spindle is driven on the above described apparatus may vary from ten revolutions per minute to a thousand or more and the speed will depend on the kind of material used in construction of the electrical discharge machining electrode.

It will be understood that while the invention has been described in connection with certain specific embodiments thereof, that this is by way of illustration and not by way of limitation and that the scope of the invention is defined solely by the appended claims which should be construed as broadly as is consistent with the prior art.

I claim:

[1. An apparatus for forming electrical discharge machining electrodes comprised of:

a first platen;

a second platen mounted in superimposed relation to said first platen;

a die member having an abrasive surface mounted on one of said platens;

a workpiece mounting member mounted on that platen opposite the platen on which said die member is mounted and in working alignment with said die member; said workpiece member adapted to hold an electrical discharge machining electrode workpiece;

means for applying oscillatory rotary motion to at least one of said members mounted on said platens; and vertically adjusting means for bringing said workpiece mounting member and said master die member into contact with each other while oscillatory rotary motion is being applied to at least one of said members to cause said workpiece to seek the form of said master die member.]

[2. The apparatus of claim 1 wherein there are means for applying solvent to said die member while contacting said members with each other under oscillatory rotary motion to thereby remove any particles within said die member.]

[3. The apparatus of claim 1 wherein the oscillatory rotary motion is adapted to be applied to said electrical discharge machining electrode and said die member is adapted to remain stationary.]

[4. The apparatus of claim 1 wherein said electrical discharge machining electrode workpiece mounting member is adapted to receive an electrically conductive material selected from the group consisting of carbon, silver, copper, platinum and the like and the die member is steel with an abrasive surface formed thereon by overburning said surface on an electrical discharge machine.]

[5. The apparatus of claim 1 wherein milling machine means are utilized to apply oscillatory rotary motion to one of said members mounted on said platens.]

*6. In apparatus of the type utilizing a die member having a cavity therein with an abrasive cavity surface for shaping an electrode workpiece into an electrode suitable for use in electrical discharge machining, said apparatus being of the type having an electrode workpiece mounting member and a die mounting member in oppositely disposed relation and subjected to relative movement toward one another in a longitudinal direction to force said electrode workpiece into said cavity in engagement with said abrasive cavity surface, and having drive means operative during said relative movement which imparts to one of said die mounting and workpiece mounting members oscillatory rotary movement perpendicular to said longitudinal direction to effect abrasion of said electrode workpiece by said abrasive cavity surface to form said workpiece into an electrode which is undersize relative to said cavity by an amount equal to the total amplitude of said oscillatory rotary movement, the improvement comprising, in combination, die mounting means, workpiece mounting means, longitudinal support means supporting one of said die and workpiece mounting means so as to permit movement of said one mounting means in any direction perpendicular to said longitudinal direction, and at least two synchronized eccentric drive means on parallel spaced axes connected to said one mounting means to impart oscillatory rotary movement thereto and to control the orientation of said one mounting means during such movement.*

*7. Apparatus as defined in claim 6 where said two synchronized drive means comprise a pair of rotatable eccentric drive members both of which connect directly with said one mounting means.*

*8. Apparatus as defined in claim 6 where said two synchronized drive means comprise a pair of rotatable shafts having eccentric drive members on the ends thereof, both of said eccentric drive members being connected directly with said one mounting means.*

*9. Apparatus as defined in claim 8 where said pair of rotatable shafts are driven from a common drive member.*

*10. Apparatus as defined in claim 8 where each of said eccentric drive members comprises a cylindrical extension eccentrically located on the end of its corresponding rotatable shaft.*

*11. Apparatus as defined in claim 8 where said two synchronized drive means comprise a pair of rotatable shafts each having a cylindrical extension eccentrically located on the end thereof, said rotatable shafts being journalled for rotation adjacent said one mounting means and each of said cylindrical extensions being journalled directly in said one mounting means, and common drive means for driving said rotatable shafts.*

*12. Apparatus as defined in claim 8 where said longitudinal support means provides longitudinal support for said one mounting means without restricting the orientation of said one mounting means whereby said two synchronized drive means comprise the sole means for controlling the orientation of said one mounting means during oscillatory rotary movement thereof.*

*13. Apparatus as defined in claim 8 where one of said die and workpiece mounting means is guided by at least three longitudinal guide posts for longitudinal sliding movement thereon toward the other of said mounting means, said guide posts serving to maintain said two mounting means in parallel relation during said longitudinal movement.*

*14. Apparatus as defined in claim 13 where one of said mounting means comprises a plate member guided on four vertical guide posts located in spaced relation proximate the peripheral portion of said plate member, said plate member being vertically slidable on said guide posts to effect said relative longitudinal movement.*

*15. Apparatus as defined in claim 8 wherein solvent flusing means are associated with one of said electrode workpiece and die members.*

References Cited

The following references, cited by the Examiner, are of record in the patented file of this patent or the original patent.

UNITED STATES PATENTS

| | | | |
|---|---|---|---|
| 512,012 | 1/1894 | Delano et al. | |
| 2,411,052 | 11/1946 | Oakley | 51—125 X |
| 2,412,141 | 12/1946 | Ford | 51—119 |
| 2,412,306 | 12/1946 | Stoll | 51—156 X |
| 2,700,259 | 1/1955 | Dreyfus | 51—119 X |
| 2,955,389 | 10/1960 | Thebault | 51—119 |
| 3,135,852 | 6/1964 | Bentley et al. | 219—69 V |
| 3,145,286 | 8/1964 | Fehling et al. | 219—69 M |
| 3,225,492 | 12/1965 | Day et al. | 51—157 X |
| 3,344,255 | 9/1967 | Ferguson | 219—69 C |
| 1,241,954 | 10/1917 | Furtado | 74—86 X |
| 2,395,537 | 2/1946 | Crosby | 51—170 |
| 3,176,526 | 4/1965 | Fischer | 74—86 |
| 3,564,190 | 2/1971 | Kandajan et al. | 219—69 M X |
| 3,663,786 | 5/1972 | O'Connor | 219—69 V |

FOREIGN PATENTS

| | | | |
|---|---|---|---|
| 1,451,464 | 7/1966 | France | 51—156 |
| 1,379,623 | 10/1964 | France | 219—69 M |

LESTER M. SWINGLE, Primary Examiner

U.S. Cl. X.R.

51—58; 219—69 V